(12) United States Patent
Arai et al.

(10) Patent No.: US 10,025,137 B2
(45) Date of Patent: Jul. 17, 2018

(54) LIQUID CRYSTAL DISPLAY DEVICE HAVING TRANSMITTING REGION AND REFLECTING REGION

(71) Applicant: ORTUS TECHNOLOGY CO., LTD., Hino (JP)

(72) Inventors: Norihiro Arai, Hino (JP); Kunpei Kobayashi, Tachikawa (JP); Ryota Mizusako, Sagamihara (JP)

(73) Assignee: ORTUS TECHNOLOLGY CO., LTD., Hino (JP)

( * ) Notice: Subject to any disclaimer, the term of this patent is extended or adjusted under 35 U.S.C. 154(b) by 0 days.

(21) Appl. No.: 15/053,547

(22) Filed: Feb. 25, 2016

(65) Prior Publication Data
US 2016/0170263 A1 Jun. 16, 2016

Related U.S. Application Data

(63) Continuation of application No. PCT/JP2013/073010, filed on Aug. 28, 2013.

(51) Int. Cl.
*G02F 1/1335* (2006.01)
*G02F 1/1343* (2006.01)
(Continued)

(52) U.S. Cl.
CPC .. *G02F 1/133555* (2013.01); *G02F 1/134309* (2013.01); *G02F 1/134363* (2013.01);
(Continued)

(58) Field of Classification Search
CPC combination set(s) only.
See application file for complete search history.

(56) References Cited

U.S. PATENT DOCUMENTS

2003/0218664 A1* 11/2003 Sakamoto ......... G02F 1/133555
347/114
2006/0050212 A1 3/2006 Tsuchiya
(Continued)

FOREIGN PATENT DOCUMENTS

CN 101324719 A 12/2008
CN 102422206 4/2012
(Continued)

OTHER PUBLICATIONS

International Preliminary Report on Patentability dated Mar. 10, 2016 in corresponding International Patent Application No. PCT/JP2013/073010.

(Continued)

*Primary Examiner* — Lauren Nguyen

(57) ABSTRACT

A liquid crystal display device includes: a first substrate and a second substrate; a liquid crystal layer sandwiched between the first substrate and the second substrate, containing P-type liquid crystal molecules, and configured to be perpendicularly aligned when no electric field is applied; a pixel including a reflecting region and a transmitting region, cell gaps of the reflecting region and the transmitting region being the same; one pixel electrode formed into a line on the first electrode; a first common electrode provided on the first substrate to sandwich the pixel electrode; a second common electrode provided on the second substrate; and a reflecting film provided in the reflecting region to overlap a portion of the pixel electrode, and comprising a conductive material.

9 Claims, 12 Drawing Sheets

(51) Int. Cl.
  *G02F 1/1337*   (2006.01)
  *G02F 1/137*   (2006.01)
(52) U.S. Cl.
  CPC .............. *G02F 2001/13706* (2013.01); *G02F 2001/133742* (2013.01); *G02F 2001/134372* (2013.01); *G02F 2001/134381* (2013.01)

(56) References Cited

U.S. PATENT DOCUMENTS

| | | | |
|---|---|---|---|
| 2008/0111932 | A1 | 5/2008 | Yamaguchi et al. |
| 2008/0165309 | A1* | 7/2008 | Ge .................... G02F 1/136213 349/85 |
| 2008/0231781 | A1 | 9/2008 | Ge et al. |
| 2010/0225855 | A1 | 9/2010 | Lu |
| 2011/0128458 | A1* | 6/2011 | Morishita ......... G02F 1/134363 349/33 |
| 2014/0160402 | A1 | 6/2014 | Xie |
| 2015/0124202 | A1 | 5/2015 | Kang |

FOREIGN PATENT DOCUMENTS

| | | |
|---|---|---|
| CN | 102707520 A | 10/2012 |
| CN | 102981325 A | 3/2013 |
| CN | 103197475 A | 7/2013 |
| JP | 2003-262852 | 9/2003 |
| JP | 2003-270627 | 9/2003 |
| JP | 2006-18116 | 1/2006 |
| JP | 2006-78742 | 3/2006 |
| JP | 2008-9199 | 1/2008 |
| JP | 2008-76503 | 4/2008 |
| JP | 2008-78742 | 4/2008 |
| JP | 2009-116215 | 5/2009 |
| JP | 2011-149966 | 8/2011 |
| JP | 2011-149967 | 8/2011 |
| JP | 2013-182203 | 9/2013 |
| WO | WO 2012/121174 A1 | 9/2012 |

OTHER PUBLICATIONS

Extended European Search Report dated Jan. 5, 2017 in corresponding European Patent Application No. 13892356.0.
International Search Report dated Dec. 3, 2013, in corresponding International Application No. PCT/JP2013/073010.
Japanese Office Action dated Mar. 31, 2015 in corresponding Japanese Patent Application No. 2012-047023.
Korean Office Action for Korean Application No. 2016-7007965 dated Mar. 22, 2017.
Office Action dated Feb. 1, 2018, in corresponding Chinese Patent Application No. 201380079107.3, 16 pgs.

* cited by examiner

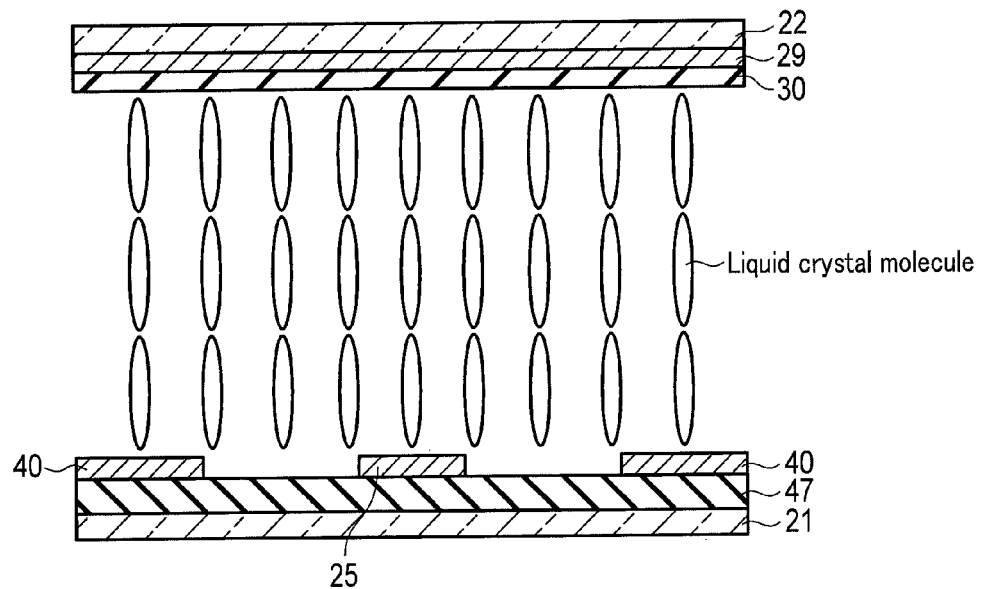
F I G. 9A
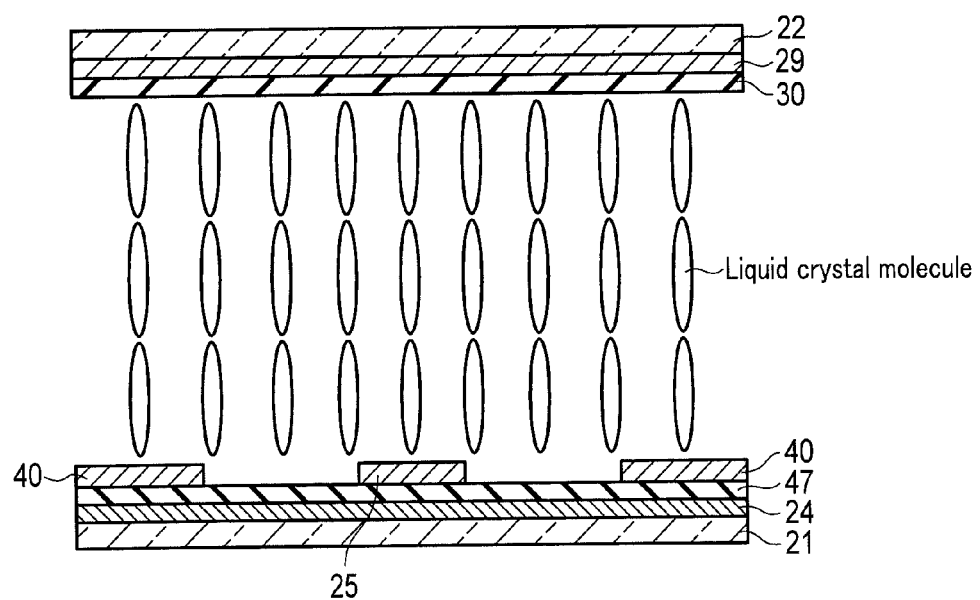
F I G. 9B

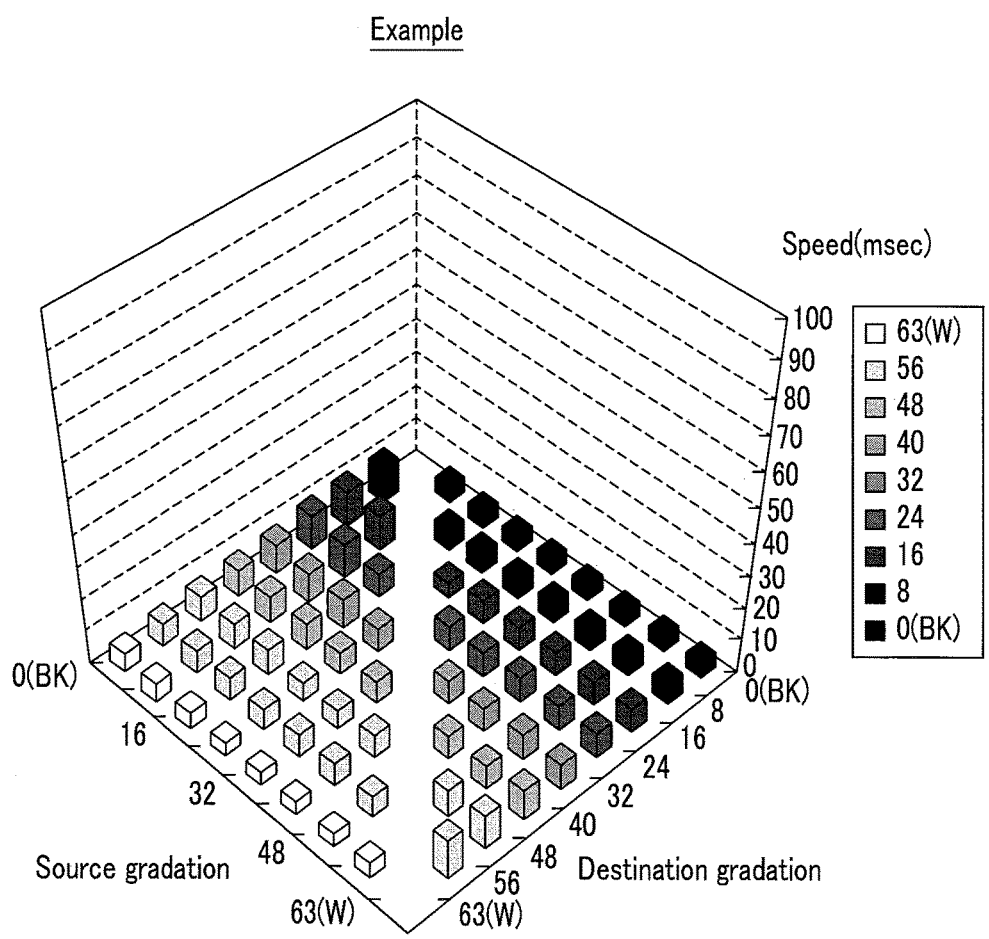
F I G. 11

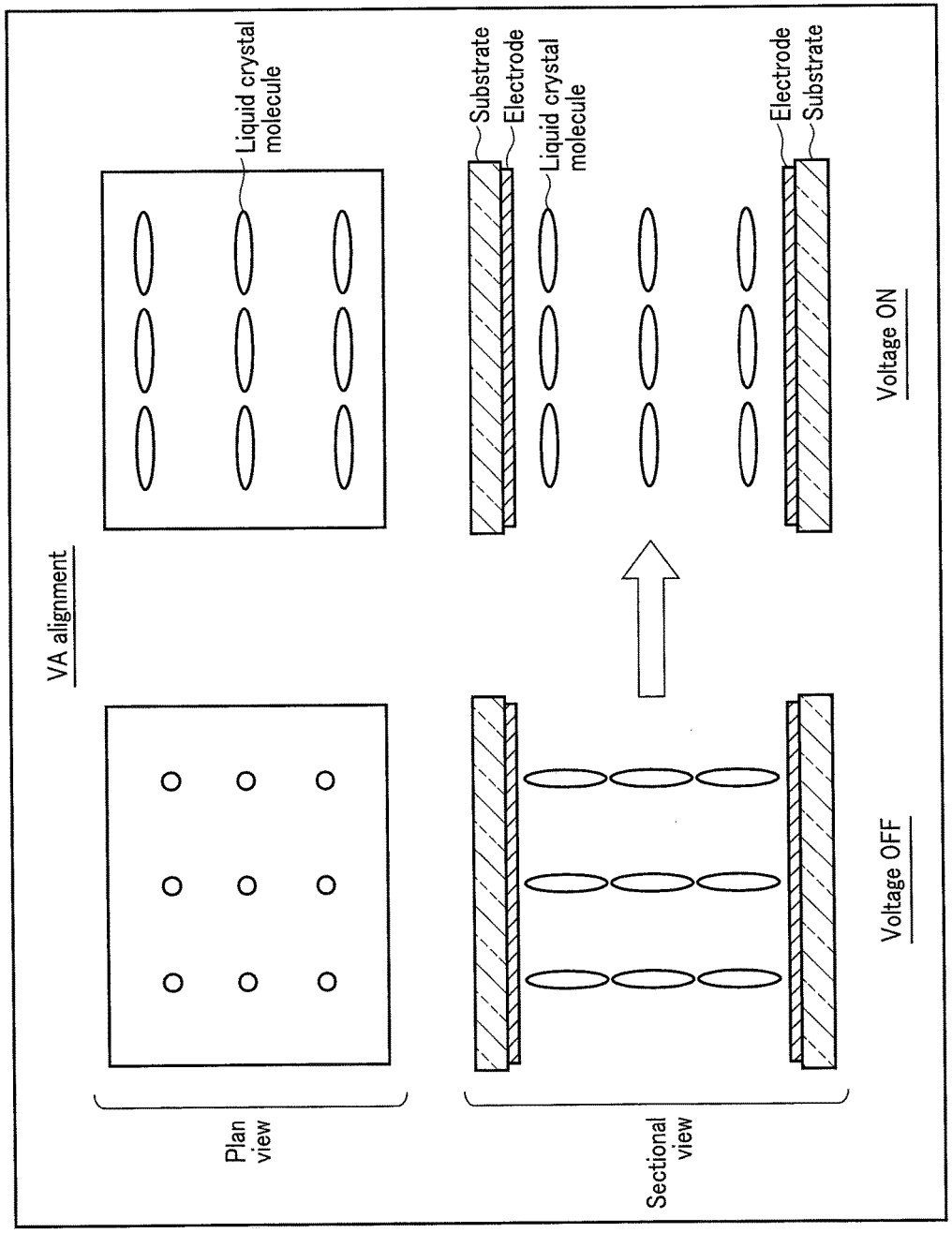
F I G. 13

LIQUID CRYSTAL DISPLAY DEVICE HAVING TRANSMITTING REGION AND REFLECTING REGION

CROSS-REFERENCE TO RELATED APPLICATIONS

This application is a Continuation application of PCT Application No. PCT/JP2013/073010, filed Aug. 28, 2013, the entire contents of all of which are incorporated herein by reference.

BACKGROUND OF THE INVENTION

1. Field of the Invention

The present invention relates to a liquid crystal display device and, more particularly, to a transreflective liquid crystal display device which achieves both transmitting display and reflecting display.

2. Description of the Related Art

As a liquid crystal display device which improves outdoor visibility, a transreflective liquid crystal display device capable of displaying images in both a transmitting mode and reflecting mode is known. In this transreflective liquid crystal display device, a reflecting region and transmitting region are formed by patterning a reflecting metal film formed inside a liquid crystal cell, thereby dividing one display pixel into the reflecting region and transmitting region. Then, the optical characteristic is optimized by changing the ratio of the reflecting region and transmitting region. In addition, a transparent step film or the like is formed in the reflecting region, and the optical characteristic is optimized by changing the cell gap between the reflecting region and transmitting region (by using a multi-gap) (see, e.g., "Jpn. Pat. Appln. KOKAI Publication No. 2003-262852" and "Jpn. Pat. Appln. KOKAI Publication No. 2003-270627").

In this liquid crystal display device having the multi-gap as described above, a step is formed between the reflecting region and transmitting region, so an alignment defect occurs in the boundary of this step and causes a leak of light. This poses the problem that the contrast decreases. If this step portion is shielded in order to prevent the decrease in contrast, the effective aperture decreases.

Also, since the transparent step film must be formed in the reflecting region in order to change the cell gap, the number of manufacturing steps increases compared to a transmitting liquid crystal display device or the like. Furthermore, reflecting regions are collectively arranged in one portion when forming transparent step films in these reflecting regions, i.e., the arrangement of the reflecting regions is restricted. This influence is particularly large in a high-resolution panel exceeding 300 ppi (pixels per inch). This makes it very difficult to manufacture a transreflective, high-resolution panel.

In addition, a display operation which evenly moves all liquid crystal molecules in the thickness direction of a liquid crystal layer by applying a voltage in the thickness direction is generally disadvantageous in increasing the response speed.

BRIEF SUMMARY OF THE INVENTION

According to an aspect of the present invention, there is provided a liquid crystal display device comprising:

a first substrate and a second substrate opposing each other;

a liquid crystal layer sandwiched between the first substrate and the second substrate, containing P-type liquid crystal molecules, and configured to be perpendicularly aligned when no electric field is applied;

a pixel including a reflecting region and a transmitting region, cell gaps of the reflecting region and the transmitting region being the same;

one pixel electrode formed into a line on the first electrode;

a first common electrode provided on the first substrate to sandwich the pixel electrode;

a second common electrode provided on the second substrate; and a reflecting film provided in the reflecting region to overlap a portion of the pixel electrode, and comprising a conductive material.

BRIEF DESCRIPTION OF THE SEVERAL VIEWS OF THE DRAWING

FIG. 9A is a view for explaining the alignment state of a liquid crystal layer in a transmitting region when no electric field is applied.

FIG. 9B is a view for explaining the alignment state of the liquid crystal layer in a reflecting region when no electric field is applied.

FIG. 11 is a graph showing the response characteristic of the liquid crystal display device according to an example.

FIG. 13 is a schematic view of the operation of liquid crystal molecules in a VA mode.

DETAILED DESCRIPTION OF THE INVENTION

Figure 1:
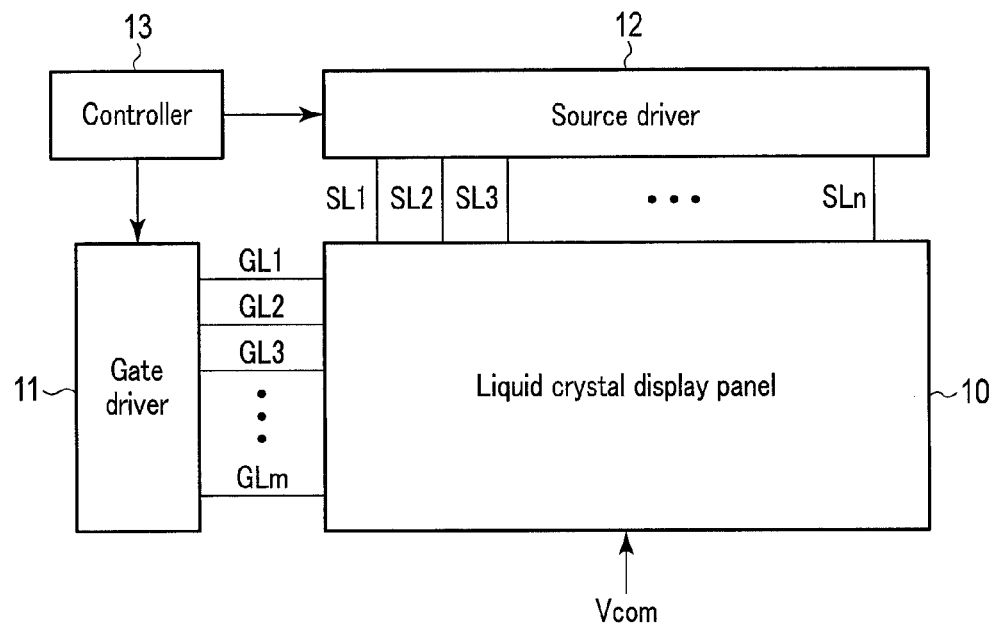
FIG. 1 is a block diagram of a liquid crystal display device according to an embodiment.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios in different drawings. Several embodiments to be described below represent examples of apparatuses and methods for embodying the technical idea of the present invention, and the technical idea of the present invention is not specified by the shapes, structures, and layouts of the constituent parts. The technical idea of the present invention can be embodied by modifying constituent elements without departing from the gist of the invention. Note that in the following explanation, the same reference numerals denote elements having the same functions and arrangements, and a repetitive explanation will be made only when necessary.

[1. Overall Arrangement of Liquid Crystal Display Device]

A liquid crystal display device of this embodiment is a transreflective (semi-transmitting) liquid crystal display device including a reflecting portion which displays an image by selectively reflecting external light, and a transmitting portion which displays an image by selectively transmitting backlight. In this embodiment, an active matrix liquid crystal display device will be explained as an example.

FIG. 1 is a block diagram of the liquid crystal display device according to this embodiment. This liquid crystal display device includes a liquid crystal display panel 10, gate driver (scanning line driver) 11, source driver (signal line driver) 12, and controller 13.

The liquid crystal display panel 10 includes a plurality of scanning lines GL1 to GLm running in the row direction, and a plurality of signal lines SL1 to SLn running in the column direction. One pixel is formed in the intersecting region of one scanning line GL and one signal line SL.

The gate driver 11 supplies scan signals to the scanning lines GL1 to GLm under the control of the controller 13. The source driver 12 supplies image signals to the signal lines SL1 to SLn at a timing at which a switching element in each row is turned on by the scan signal, under the control of the controller 13. Consequently, a pixel electrode included in a pixel is set at a pixel potential corresponding to the image signal supplied via the switching element. The controller 13 controls the gate driver 11 and source driver 12, and supplies a common voltage Vcom (e.g., 0 V) to the liquid crystal display panel 10.

Figure 2:
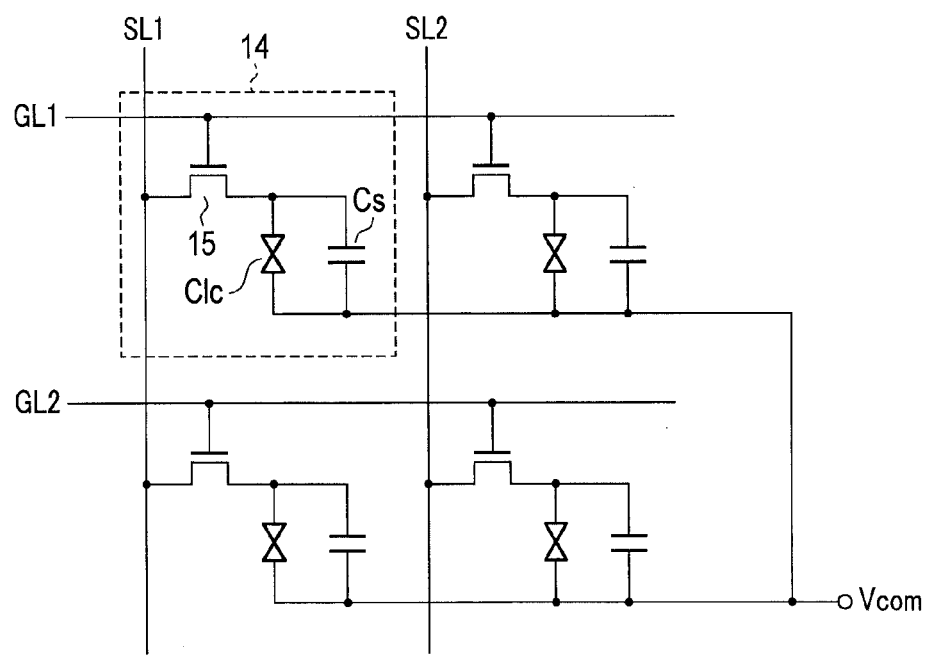
FIG. 2 is a circuit diagram of a liquid crystal display panel.

FIG. 2 is a circuit diagram of the liquid crystal display panel 10. The liquid crystal display panel 10 includes a plurality of pixels 14 arranged in the directions in which the scanning lines GL and signal lines SL run. As a switching element 15, a TFT (Thin Film Transistor) or the like is used. The TFT 15 includes a gate electrically connected to the scanning line GL, a source electrically connected to the signal line SL, and a drain electrically connected to a pixel electrode. The pixel electrode forms a pixel capacitor Clc together with a common electrode opposing the pixel electrode, and with a liquid crystal filled between the pixel electrode and common electrode.

Also, in the liquid crystal display panel 10, a holding capacitor line is formed for each pixel row, and a holding capacitor (storage capacitor) Cs is formed for each pixel by an insulating film formed between this holding capacitor line and the pixel electrode. The holding capacitor line is set at, e.g., the same potential (the common voltage Vcom) as that of the common electrode. A voltage written in a pixel is stored in the holding capacitor Cs, and held until next data is written.

Note that in this specification, one of the drain and source of the TFT, which is connected to the signal line SL, is called "a source", and the other which is connected to the pixel electrode is called "a drain". However, one which is connected to the signal line SL is sometimes called "a drain", and the other which is connected to the pixel electrode is sometimes called "a source".

Figure 3:
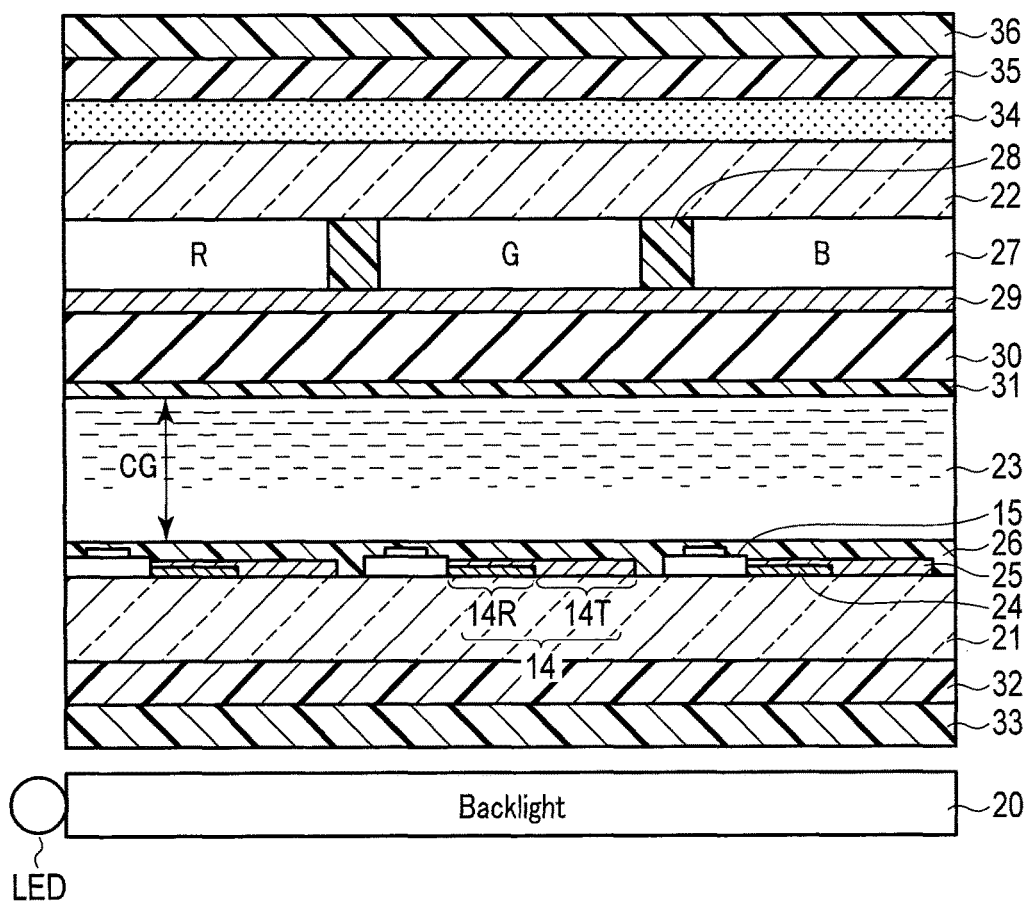
FIG. 3 is a sectional view of the liquid crystal display device.

Next, a detailed structure of the liquid crystal display device will be explained. FIG. 3 is a sectional view of the liquid crystal display device. Note that various lines are not shown in FIG. 3, and the structures of these lines will be described later.

A surface light source (backlight) 20 is arranged on a side opposite to the display side of the liquid crystal display panel 10. The backlight 20 is, e.g., a side-light type backlight device. That is, the backlight 20 has a structure in which light from a plurality of light-emitting elements such as LEDs (Light-Emitting Diodes) enters from one short side of a light-guiding plate. The light exits toward the liquid crystal display panel 10 from one plate surface of the light-guiding plate.

The liquid crystal display device includes a TFT substrate 21 including TFTs, pixel electrodes, and the like, a color filter substrate (CF substrate) 22 including a color filter and a common electrode and facing the TFT substrate 21, and a liquid crystal layer 23 sandwiched between the two substrates 21 and 22. The TFT substrate 21 and CF substrate 22 are formed by transparent substrates (e.g., glass substrates).

The liquid crystal layer 23 is formed by a liquid crystal material sealed by a sealing material (not shown) which bonds the TFT substrate 21 and CF substrate 22. The liquid crystal material changes the optical characteristic when the alignment direction of liquid crystal molecules is manipulated in accordance with an electric field applied between the TFT substrate 21 and CF substrate 22. The liquid crystal molecules forming the liquid crystal layer 23 are positive-type (P-type) molecules, and are aligned almost perpendicularly to the substrate surface when no voltage is applied. Note that when an electric field is applied to the P-type liquid crystal layer, the major axis (director) of the liquid crystal molecule points in the electric field direction.

The TFT substrate 21 includes the TFTs 15, reflecting films 24, and pixel electrodes 25. In addition, an alignment film 26 is formed on the TFT substrate 21 so as to cover the TFTs 15, reflecting films 24, and pixel electrodes 25. Note that one display pixel (pixel) is formed by three sub pixels including red (R), green (G), and blue (B) color filters. In the following explanation, the sub pixel will be called "a pixel" except when it is particularly necessary to distinguish between the display pixel and sub pixel.

The TFT 15 is a switching element which is formed on that side of the TFT substrate 21, which faces the liquid crystal layer 23, and switches ON/OFF of the pixel. That is, the liquid crystal display device of this embodiment adopts an active matrix type driving method. The reflecting film 24 is formed in, e.g., a half region of the pixel 14, and has a function of reflecting external light entering from the display surface of the liquid crystal display device. The plurality of pixel electrodes 25 are each electrically connected to one end of the current path of the TFT 15, and are formed into a matrix pattern on that side of the TFT substrate 21, which faces the liquid crystal layer 23. The pixel electrode 25 is formed by a transparent conductive film such as ITO (indium tin oxide). The alignment film 26 controls the alignment of liquid crystal molecules.

The CF substrate 22 includes a color filter 27, a common electrode 29, a dielectric film 30, and an alignment film 31. The color filter 27 is formed on that side of the CF substrate 22, which faces the liquid crystal layer 23, and includes color filters 27R, 27G, and 27B of three colors, i.e., red, green, and blue. The color filters 27R, 27G, and 27B are arranged in positions opposing the pixel electrodes 25, and a light-shielding film (black matrix) 28 for preventing color mixing is formed between the color filters 27R, 27G, and 27B.

The common electrode 29 is formed on that side of the color filters 27, which faces the liquid crystal layer 23, and has a size facing all the pixel electrodes 25. The common electrode 29 is formed by a transparent conductive film such as ITO. The dielectric film 30 is made of, e.g., a transparent resin, and has a function of adjusting an electric field to be applied to the liquid crystal layer 23. More specifically, an electric field to be applied to the liquid crystal layer 23 weakens when the transparent resin film 30 is thickened, and strengthens when the transparent resin film 30 is thinned. The film thickness of the transparent resin film 30 is, e.g., 3 µm or less. Also, the transparent resin film 30 need not always be formed. The alignment film 31 makes a pair with the alignment film 26, and controls the alignment of liquid crystal molecules. In this embodiment, the alignment films 26 and 31 align liquid crystal molecules almost perpendicularly to the substrate surface when there is almost no potential difference between the pixel electrode 25 and common electrode 29, i.e., when no electric field is applied between the pixel electrode 25 and common electrode 29.

The pixel 14 includes a reflecting region 14R and transmitting region 14T. The reflecting region 14R is a region of the pixel 14 where the reflecting film 24 is formed, and the transmitting region 14T is a region of the pixel 14 where the reflecting film 24 is not formed. In this embodiment, as shown in FIG. 3, a thickness (cell gap) CG of the liquid crystal layer 23 in the reflecting region 14R and transmitting region 14T is uniform (a flat gap). The cell gap CG can be kept uniform over the entire screen by arranging, e.g., columnar spacers in the liquid crystal layer 23.

A retardation plate 32 and polarizing plate 33 are formed on that side of the TFT substrate 21, which faces the backlight 20. A diffusing adhesive material 34 is formed on the display surface side of the CF substrate 22. A retardation plate 35 and polarizing plate 36 are formed on the display surface side of the diffusing adhesive material 34. The diffusing adhesive material 34 diffuses (scatters) light, thereby achieving a function of making transmitted light and reflected light uniform, and a function of reducing interference (iridescence) of reflected light. The diffusing adhesive material 34 may also be formed between the retardation plate 35 and polarizing plate 36.

The polarizing plates 33 and 36 extract, from light having oscillation surfaces in random directions, light having an oscillation surface in one direction parallel to the transmission axis, i.e., light having the polarized state of linearly polarized light. Each of the polarizing plates 33 and 36 has an absorption axis and transmission axis perpendicular to each other, in a plane perpendicular to the propagation direction of light.

Each of the retardation plates 32 and 35 has refractive index anisotropy, and has a slow axis and fast axis perpendicular to each other in a plane. The retardation plates 32 and 35 have a predetermined retardation (phase difference) defined by $\Delta n \cdot d$ (nm) (where $\Delta n = ne - no$, and d is the thickness of the retardation plate). The retardation plates 32 and 35 have a function of giving a predetermined retardation (a phase difference of $\lambda/4$ where $\lambda$ is the wavelength of transmitted light) between light components having a predetermined wavelength and transmitted through the slow axis and fast axis. That is, the retardation plates 32 and 35 are formed by $\lambda/4$ plates.

The absorption axis of the polarizing plate 33 and the slow axis of the retardation plate 32 are so arranged as to make an angle of 45°. Likewise, the absorption axis of the polarizing plate 36 and the slow axis of the retardation plate 35 are so arranged as to make an angle of 45°. Also, the polarizing plates 33 and 36 are arranged such that their absorption axes make an angle of 90°.

[2. Structure of Pixel]

Figure 4:
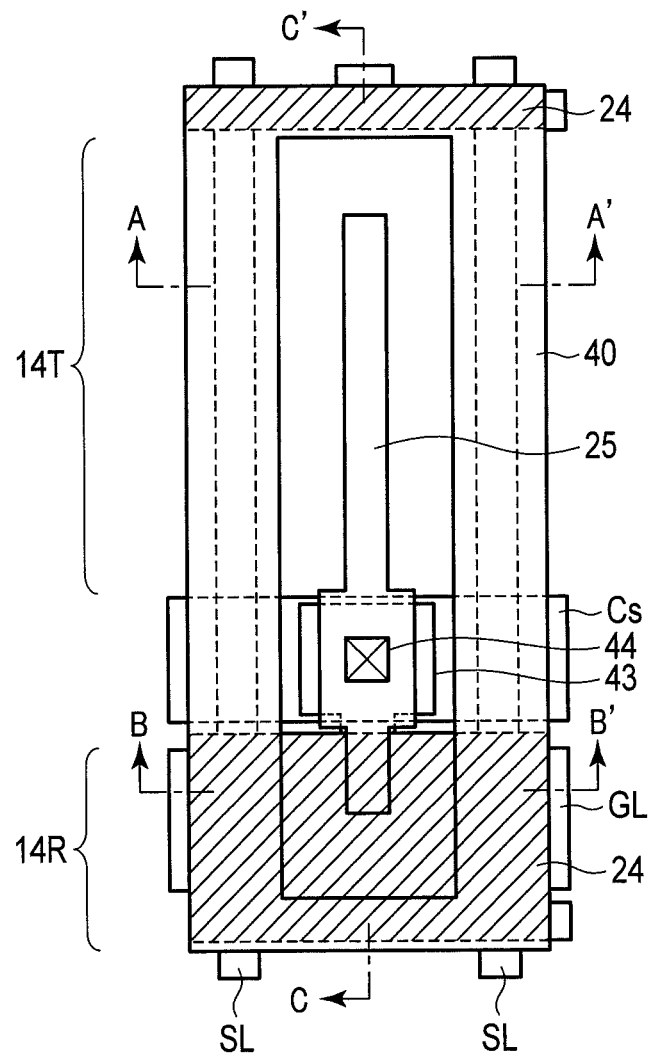
FIG. 4 is a plan view of a pixel.
Figure 5:
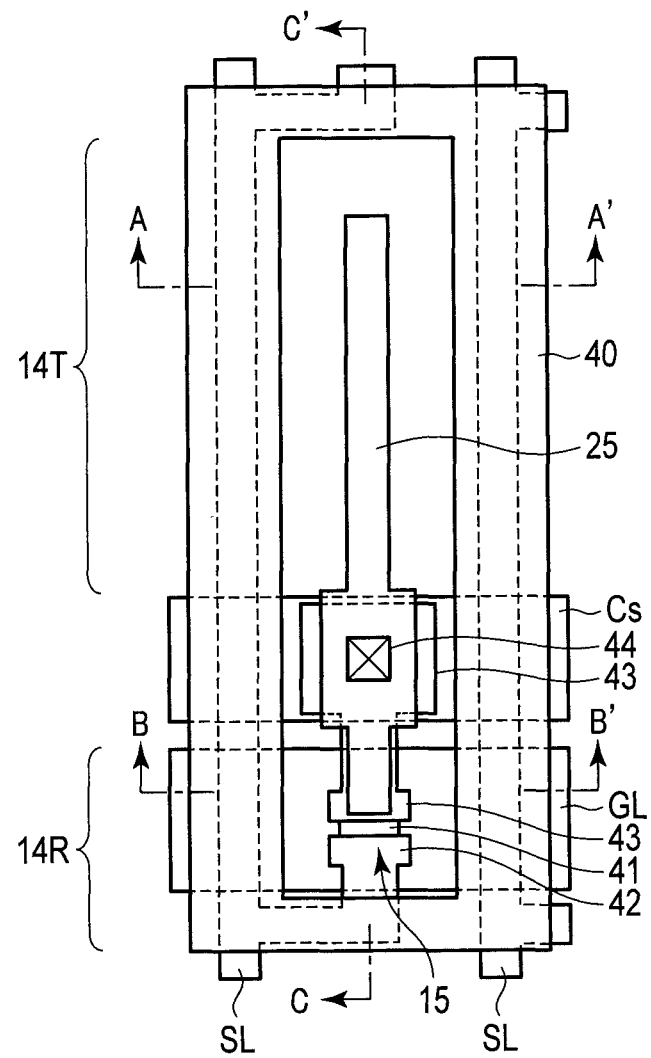
FIG. 5 is a plan view in which a reflecting film is removed from the plan view of FIG. 4.
Figure 6:
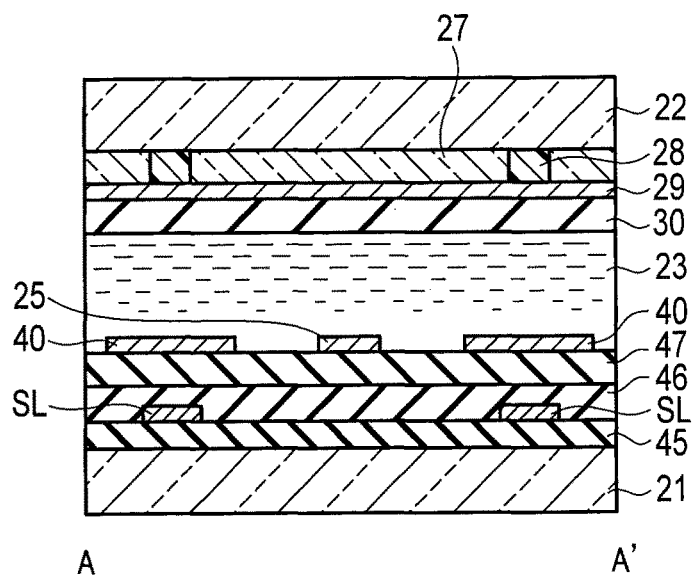
FIG. 6 is a sectional view of the pixel taken along a line A-A' in FIG. 4.
Figure 7:
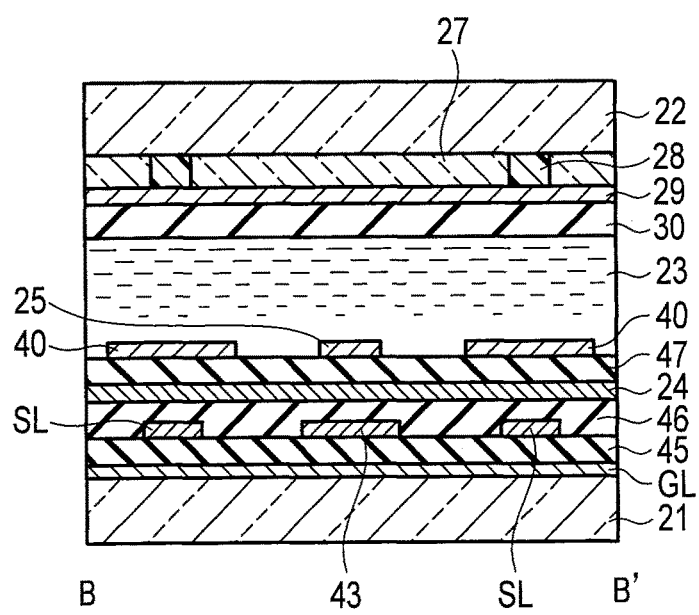
FIG. 7 is a sectional view of the pixel taken along a line B-B' in FIG. 4.
Figure 8:
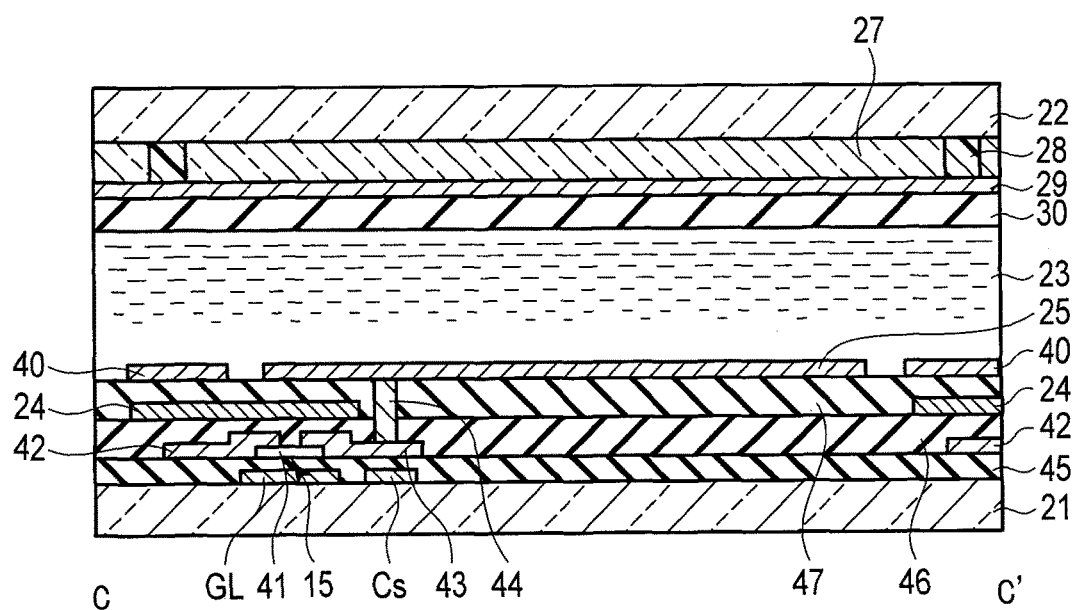
FIG. 8 is a sectional view of the pixel taken along a line C-C' in FIG. 4.

A detailed structure of the pixel 14 will be explained below. FIG. 4 is a plan view of the pixel 14. FIG. 5 is a plan view excluding the reflecting film 24 from the plan view of FIG. 4. FIG. 6 is a sectional view of the pixel 14 taken along a line A-A' in FIG. 4. FIG. 7 is a sectional view of the pixel 14 taken along a line B-B' in FIG. 4. FIG. 8 is a sectional view of the pixel 14 taken along a line C-C' in FIG. 4. Note that the sectional views of FIGS. 6 to 8 specifically show only a structure between the TFT substrate 21 and CF substrate 22. Note also that the sectional views of FIGS. 6 to 8 do not show the alignment films 26 and 31.

On the TFT substrate 21, the scanning line GL running in the row direction and the holding capacitor line Cs running in the row direction are formed. The scanning line GL functions as the gate electrode of the TFT 15. The holding capacitor line Cs forms a holding capacitor for each pixel 14. An insulating film 45 is formed on the TFT substrate 21 so as to cover the scanning line GL and holding capacitor line Cs. The insulating film 45 on the scanning line GL also functions as a gate insulating film of the TFT 15.

A semiconductor layer 41 is formed above the scanning line GL and on the insulating film 45. The semiconductor layer 41 is made of, e.g., amorphous silicon or polysilicon. A source electrode 42 and drain electrode 43 are formed on the two sides of the gate electrode GL and on the insulating film 45. The source electrode 42 and drain electrode 43 are in partially contact with the semiconductor layer 41. The gate electrode GL, gate insulating film 45, source electrode 42, and drain electrode 43 form the TFT 15. The source electrode 42 is electrically connected to the signal line SL.

An insulating film 46 is formed on the TFT 15. The reflecting film 24 is formed on the insulating film 46. The reflecting film 24 forming the reflecting region 14R is formed in a partial region of the pixel 14. The reflecting film 24 is made of a conductive material, and the common voltage Vcom can be applied to the reflecting film 24. The TFT 15 is positioned below the reflecting film 24, and hiding behind the reflecting film 24 when viewed from the display surface. This can suppress deterioration of the image quality caused by the TFT 15.

An insulating film 47 is formed on the reflecting film 24. The pixel electrode 25 and common electrode 40 are formed on the insulating film 47. That is, the pixel electrode 25 and common electrode 40 are formed by interconnection layers on the same level. The pixel electrode 25 is electrically connected to the drain electrode 43 by a contact plug 44. The holding capacitor line Cs is positioned below the contact plug 44.

The pixel electrode 25 is linearly formed in the central portion of the pixel 14. That is, the plurality of pixel electrodes 25 in the column direction are formed into stripes. The width of the pixel electrode 25 is desirably as small as possible, and is set at, e.g., about a minimum feature size resulting from a manufacturing step (e.g., a lithography step) to be used. In this embodiment, the width of the pixel electrode 25 is, e.g., about 2 to 3 µm. The pixel electrode 25 is so formed as to partially overlap the reflecting film 24.

The common electrode 40 is so formed as to sandwich the pixel electrode 25 from the two sides in the column direction with a predetermined spacing between them. The spacing between the common electrode 40 and pixel electrode 25 is set at 15 μm or less, and is desirably about 3 to 4 μm. Note that the common electrode 40 may also be so formed as to surround the pixel electrode 25 with a predetermined spacing between them. The common electrode 40 is so formed as to cover the signal line SL in order to prevent the influence of an electric field from the signal line SL. That is, the common electrode 40, signal line SL, and black matrix 28 are so arranged as to overlap each other. In this embodiment, as shown in FIG. 5, when the common electrode 40 is so formed as to surround the pixel electrode 25, the common electrode 40 can cover an almost entire region of the signal line SL.

The insulating films 45 to 47 are made of a transparent insulating material, e.g., a silicon nitride film. The common electrode 40 and contact plug 44 are made of a transparent conductive material, e.g., ITO. The reflecting film 24 is made of, e.g., aluminum (Al). The source electrode 42, drain electrode 43, scanning line GL, signal line SL, and holding capacitor line Cs are made of, e.g., aluminum (Al), molybdenum (Mo), chromium (Cr), or tungsten (W), or an alloy containing one or more of these materials.

[3. Operation]

Next, the operation of the liquid crystal display device configured as described above will be explained. First, display when no electric field is applied to the liquid crystal layer 23 will be explained. FIGS. 9A and 9B are views each explaining the alignment states of the liquid crystal layer 23 when no electric field is applied to the liquid crystal layer 23. FIG. 9A shows the alignment state of the liquid crystal layer 23 in the transmitting region 14T. FIG. 9B shows the alignment state of the liquid crystal layer 23 in the reflecting region 14R.

The controller 13 applies the common voltage Vcom (0 V) to the common electrodes 29 and 40, and applies the common voltage Vcom to the pixel electrode 25 as well. Also, the same common voltage Vcom as that of the common electrode 40 is applied to the reflecting film 24 in the reflecting region 14R. Accordingly, no electric field is applied to the liquid crystal layers 23 in the transmitting region 14T and reflecting region 14R, so the liquid crystal molecules maintain the initial alignment.

In this embodiment, the liquid crystal layer 23 is a positive-type (P-type) layer, and the liquid crystal molecules are aligned almost perpendicularly to the substrate surface with no voltage being applied (in an OFF state). In the OFF state, therefore, the liquid crystal molecules in the transmitting region 14T and reflecting region 14R are aligned almost perpendicularly to the substrate surface. In this OFF state, in the transmitting region 14T, backlight transmitted through the polarizing plate 33 is transmitted through the liquid crystal layer 23 in which the retardation is almost zero, and absorbed by the polarizing plate 36 placed in a crossed-Nicol state with respect to the polarizing plate 33, thereby displaying black.

On the other hand, in the reflecting region 14R, external light transmitted through the polarizing plate 36 is transmitted through the liquid crystal layer 23 in which the retardation is almost zero, and reflected by the reflecting film 24, so the rotational direction of circular polarization is reversed. Then, the external light reflected by the reflecting film 24 is transmitted through the liquid crystal layer 23 again, and absorbed by the polarizing plate 36, thereby displaying black. In the OFF state, therefore, both the transmitting region 14T and reflecting region 14R display black.

Figure 10A:
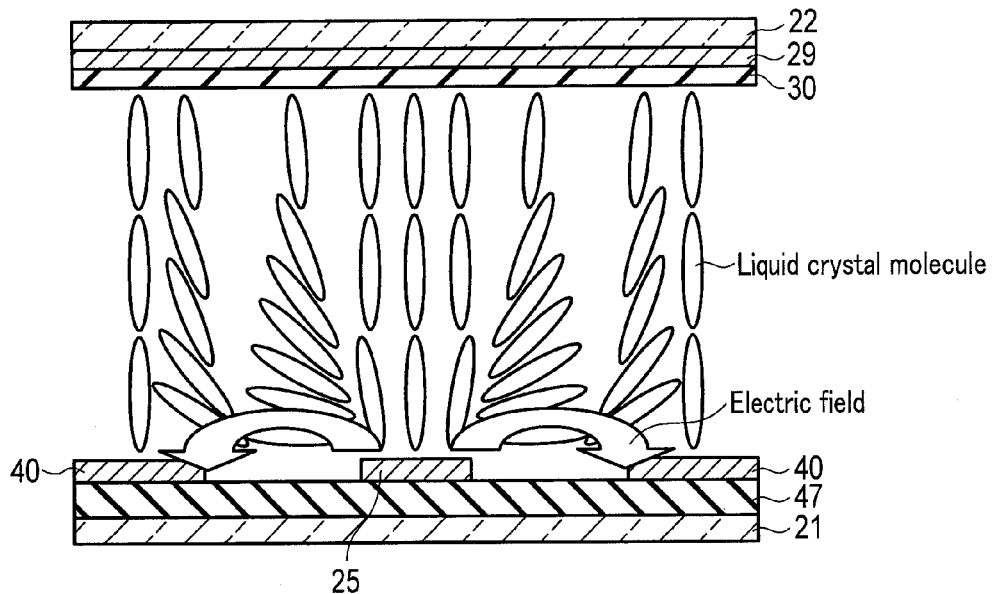
FIG. 10A is a view for explaining the alignment state of the liquid crystal layer in the transmitting region when an electric field is applied.
Figure 10B:
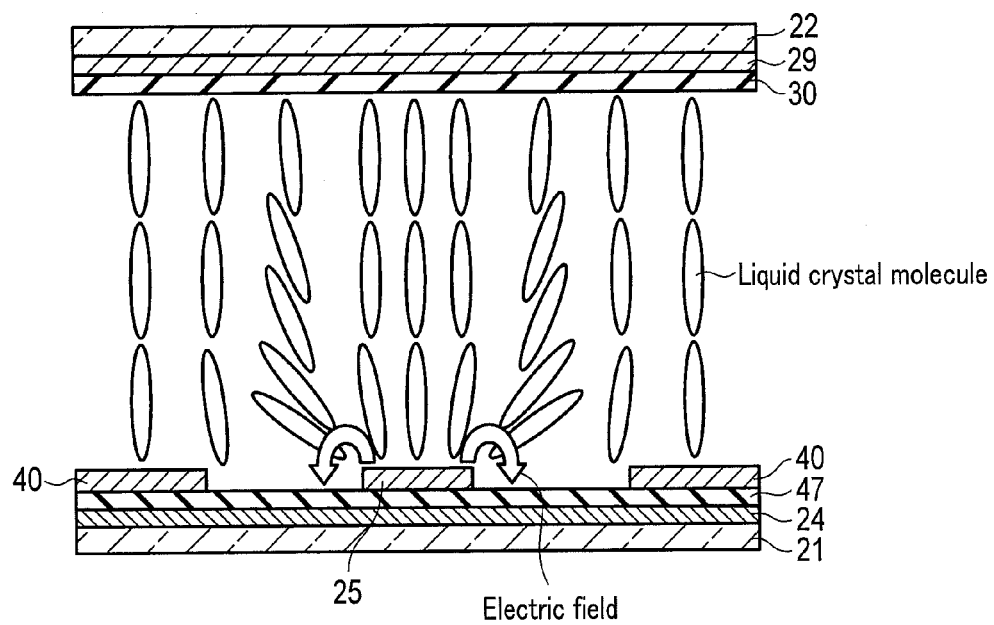
FIG. 10B is a view for explaining the alignment state of the liquid crystal layer in the reflecting region when an electric field is applied.

Display when an electric field is applied to the liquid crystal layer 23 will now be explained. FIGS. 10A and 10B are views for explaining the alignment states of the liquid crystal layer 23 when an electric field is applied to the liquid crystal layer 23. FIG. 10A shows the alignment state of the liquid crystal layer 23 in the transmitting region 14T. FIG. 10B shows the alignment state of the liquid crystal layer 23 in the reflecting region 14R.

The controller 13 applies the common voltage Vcom (0 V) to the common electrodes 29 and 40, and applies a pixel voltage (e.g., 5 V) higher than the common voltage Vcom to the pixel electrode 25. Also, the same common voltage Vcom as that of the common electrode 40 is applied to the reflecting film 24 in the reflecting region 14R. Consequently, in the transmitting region 14T, the liquid crystal molecules incline toward (fall toward) the common electrode 40 like half-bend alignment due to a transverse electric field between the pixel electrode 25 and common electrode 40, and a vertical electric field between the pixel electrode 25 and common electrode 29. That is, the closer the liquid crystal molecules to the pixel electrode 25 and common electrode 40, the more largely the liquid crystal molecules incline in the horizontal direction, and the closer the liquid crystal molecules to the common electrode 29, the weaker the transverse electric field caused by the common electrode 40, so the liquid crystal molecules are aligned in the vertical direction.

On the other hand, in the reflecting region 14R, an electric field is generated between the pixel electrode 25 and reflecting film 24 because 0 V is applied to the reflecting film 24. Accordingly, the liquid crystal molecules incline in the horizontal direction like half-bend alignment due to a transverse electric field generated on the edge of an overlapped portion of the pixel electrode 25 and reflecting film 24, and a vertical electric field generated between the pixel electrode 25 and common electrode 29. In this state, the transverse electric field in the reflecting region 14R is smaller than that in the transmitting region 14T, so the angle at which the liquid crystal molecules in the reflecting region 14R incline in the horizontal direction is smaller than that of the liquid crystal molecules in the transmitting region 14T. That is, the retardation in the reflecting region 14R can be made smaller than that in the transmitting region 14T (can be made close to ½). This makes it possible to optimize transmitting display and reflecting display without changing the gap between the liquid crystal layers in the transmitting region 14T and reflecting region 14R (i.e., without using any multi-gap).

More specifically, the gap of the liquid crystal layer 23 is so adjusted that the retardation in the ON state is almost $\lambda/2$. In the transmitting region 14T, therefore, when a voltage is applied (in the ON state), the backlight transmitted through the polarizing plate 33 is given retardation as it is transmitted through the liquid crystal layer 23, and transmitted through the polarizing plate 36, thereby displaying white.

On the other hand, in the reflecting region 14R, external light transmitted through the polarizing plate 36 is given retardation which is ½ that in the transmitting region 14T as it is transmitted through the liquid crystal layer 23, and reflected by the reflecting film 24. Then, the external light reflected by the reflecting film 24 is given retardation which is ½ that in the transmitting region 14T as it is transmitted through the liquid crystal layer 23 again, and transmitted through the polarizing plate 36, thereby displaying white. In the ON state, therefore, both the transmitting region 14T and reflecting region 14R display white.

Next, the response characteristic of the liquid crystal display device of this embodiment will be explained.

FIG. 11 is a graph showing the response characteristic of the liquid crystal display device according to this embodiment. The refractive index anisotropy of the liquid crystal layers is Δn=0.10 to 0.13 (including both), the dielectric anisotropy thereof is Δ∈=16 to 19 (including both), and the elastic constant thereof is $K_{33}$=13 to 15 pN (piconewtons) (including both). Note that the elastic constant $K_{33}$ is a bend-mode elastic constant. Referring to FIG. 11, the X-axis represents a source gradation, the Y-axis represents a destination gradation, and the Z-axis represents the response speed (msec). The source gradation means a gradation before it is changed. The destination gradation means a gradation after it is changed. The numbers on the X-axis and Y-axis of FIG. 11 represent gradations, and FIG. 11 shows the response speed when displaying 64 gradations (gradations 0 to 63). Gradation 0 is black (BK), and gradation 63 is white (W).

In this graph shown in FIG. 11, when changing display from the first gradation (source gradation) to the second gradation (destination gradation), the response speed is known from the height of a bar graph in a position where the number of the first gradation plotted on the X-axis (source gradation) and the number of the second gradation plotted on the Y-axis intersect each other.

Figure 12:
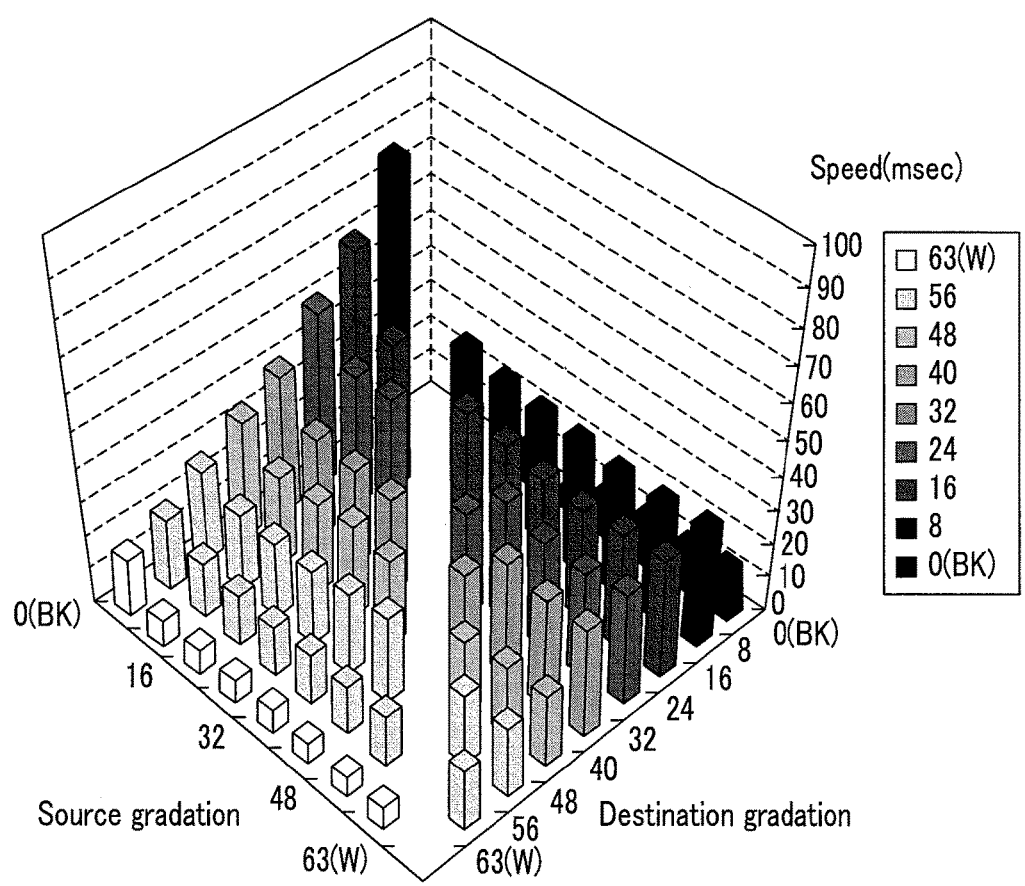
FIG. 12 is a graph showing the response characteristic of a liquid crystal display device according to a comparative example.

FIG. 12 is a graph showing the response speed of a liquid crystal display device according to a comparative example (related art) having a multi-gap structure and VA (Vertical Alignment). Comparison of FIGS. 11 and 12 reveals that the response speed of the embodiment is much higher than that of the comparative example.

[4. Effects]

In the first embodiment as described in detail above, the pixel 14 includes the reflecting region 14R and transmitting region 14T, and the liquid crystal layers 23 in the reflecting region 14R and transmitting region 14T have the same thickness (cell gap). The liquid crystal layer 23 contains P-type liquid crystal molecules, and aligns them perpendicularly to the substrate when no electric field is applied. Also, the TFT substrate 21 includes the linear pixel electrode 25, the common electrode 40 sandwiching the pixel electrode 25, and the reflecting film partially overlapping the pixel electrode 25, and the CF substrate 22 includes the common electrode 29 covering the pixel. The retardation of the liquid crystal layer in the reflecting region 14R is set to be about ½ that of the liquid crystal layer in the transmitting region 14T when a voltage is applied (in the ON state).

Accordingly, this embodiment can implement optimum reflecting display and transmitting display without changing the cell gap between the reflecting region and transmitting region (without using any flat gap). This can prevent an alignment defect caused in the boundary between the reflecting region and transmitting region in the related art (multi-gap), and can prevent a decrease in aperture because light shielding as a measure against a light leak is unnecessary. Also, since it is unnecessary to form, e.g., a transparent step film for changing the cell gap between the reflecting region and transmitting region, it is possible to reduce the number of processing steps and the cost.

Figure 14:
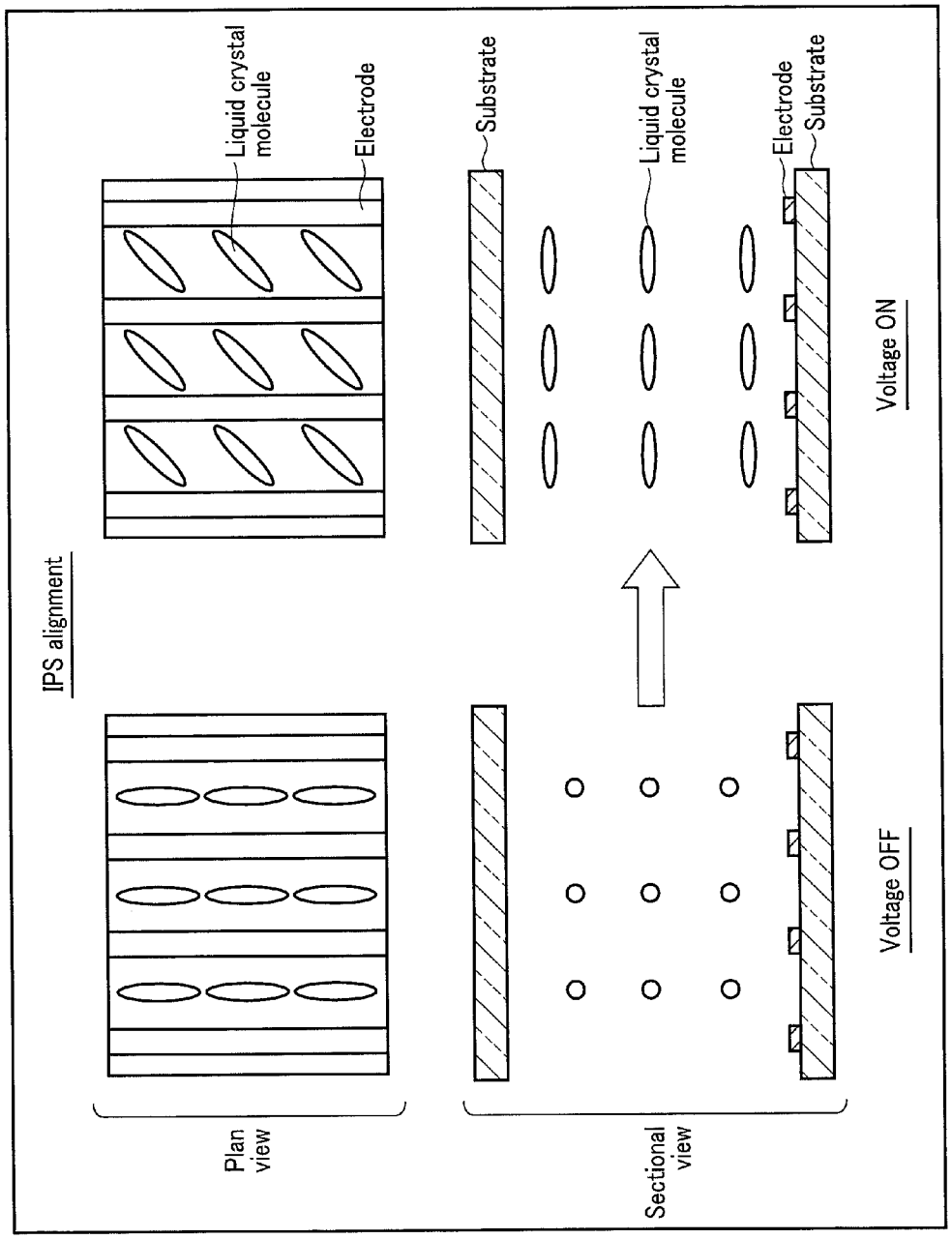
FIG. 14 is a schematic view of the operation of liquid crystal molecules in an IPS mode.

In addition, in the liquid crystal display device of this embodiment, the liquid crystal molecules take half-bend alignment. Therefore, the response speed can be made higher than those of liquid crystal display devices using TN (Twisted Nematic) alignment, homogeneous alignment, VA (Vertical Alignment), and IPS (In-Plane Switching) alignment. For example, in VA shown in FIG. 13, all liquid crystal molecules in the thickness direction of a liquid crystal layer must be moved by a voltage applied to electrodes arranged on two substrates sandwiching the liquid crystal layer. Also, in IPS alignment shown in FIG. 14, all liquid crystal molecules in the thickness direction of a liquid crystal layer must be moved by a voltage between two electrodes arranged on one substrate. Since these voltages act against the elasticity of a liquid crystal, the responsivity decreases. By contrast, in this embodiment as shown in FIGS. 10A and 10B, the response speed increases when moving liquid crystal molecules by the voltage between two electrodes on one substrate and the voltage between two electrodes on two opposing substrates. In addition, the liquid crystal display device of this embodiment is strong against a display defect (surface pressing) when the liquid crystal panel is pressed.

Furthermore, the structure of this embodiment is very effective for a conventionally difficult high-definition panel exceeding 300 ppi, and makes it possible to apply a transreflective panel as a high-definition panel.

Also, the optical design of reflecting display can be optimized by using the retardation plates 32 and 35 formed by λ/4 plates. In addition, even in transmitting display, it is possible to extract light in the area of liquid crystal molecules fallen in the axial direction of a polarizing plate, which cannot be extracted by a linear polarizing plate. This makes it possible to increase the transmittance of the transmitting region 14T.

The liquid crystal display device of this embodiment includes the transparent resin film 30 between the common electrode 29 and liquid crystal layer 23. A transverse electric field to be applied to the liquid crystal layer 23 can relatively be strengthened by thickening the transparent resin film 30, and a vertical electric field to be applied to the liquid crystal layer 23 can relatively be strengthened by thinning the transparent resin film 30. The alignment of liquid crystal molecules can be optimized by thus adjusting the film thickness of the transparent resin film 30 in accordance with the characteristic of the liquid crystal layer 23.

While certain embodiments of the inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate and a second substrate opposing each other;
   a liquid crystal layer sandwiched between the first substrate and the second substrate, containing P-type liquid crystal molecules, and configured to be perpendicularly aligned when no electric field is applied;
   a pixel including a reflecting region and a transmitting region, the reflecting region having a cell gap distance that is the same as a cell gap distance of the transmitting region, the reflecting region being adjacent to the transmitting region in a first direction;
   a pixel electrode provided on the first substrate to extend in the first direction, and located in both the reflecting region and the transmitting region;
   a first common electrode including first and second portions, the first and second portions being provided on the first substrate so as to extend longitudinally in the first direction, being located on respective opposite sides of the pixel electrode in a second direction substantially perpendicular to the first direction, and each being located in both the reflecting region and the transmitting region;

a second common electrode provided on the second substrate; and a reflecting film provided in the reflecting region to overlap a portion of the pixel electrode, and comprising a conductive material, wherein the pixel electrode and the first common electrode are not electrically connected.

2. The liquid crystal display device of claim 1, further comprising a controller that applies a same voltage to both the first common electrode and the reflecting film.

3. The liquid crystal display device of claim 1, further comprising a controller that controls the liquid crystal display device to perform a first display mode and a second display mode, wherein in the first display mode, the controller controls the liquid crystal display device to apply a same common voltage to each of the pixel electrode, the first common electrode, the second common electrode, and the reflecting film, and in the second display mode, the controller controls the liquid crystal display device to apply the same common voltage to each of the first common electrode, the second common electrode, and the reflecting film, and a voltage higher than the same common voltage to the pixel electrode.

4. The liquid crystal display device of claim 1, further comprising a dielectric film provided between the second common electrode and the liquid crystal layer.

5. The liquid crystal display device of claim 1, wherein the first common electrode surrounds the pixel electrode.

6. The liquid crystal display device of claim 1, further comprising an interconnection configured to supply a voltage to the pixel electrode, wherein the first common electrode is arranged to overlap the interconnection.

7. The liquid crystal display device of claim 1, further comprising:

a first retardation plate provided on the first substrate; and a second retardation plate provided on the second substrate, wherein a phase difference of the first retardation plate and the second retardation plate is $\lambda/4$.

8. The liquid crystal display device of claim 1, wherein the first common electrode is located on a same level as a level of the pixel electrode.

9. The liquid crystal display device of claim 1, wherein the first common electrode and the pixel electrode are mutually non-overlapping in a thickness direction of the liquid crystal layer.

* * * * *

UNITED STATES PATENT AND TRADEMARK OFFICE
CERTIFICATE OF CORRECTION

PATENT NO. : 10,025,137 B2
APPLICATION NO. : 15/053547
DATED : July 17, 2018
INVENTOR(S) : Norihiro Arai et al.

Page 1 of 1

It is certified that error appears in the above-identified patent and that said Letters Patent is hereby corrected as shown below:

On the Title Page

First column, Item [73] (Assignee):
Delete "TECHNOLOLGY" and insert -- TECHNOLOGY --, therefore.

Signed and Sealed this
Sixth Day of November, 2018

Andrei Iancu
*Director of the United States Patent and Trademark Office*